(12) United States Patent
Wang et al.

(10) Patent No.: US 8,276,373 B2
(45) Date of Patent: Oct. 2, 2012

(54) ADAPTIVE CONTROL OF SCR UREA INJECTION TO COMPENSATE ERRORS

(75) Inventors: Yue-Yun Wang, Troy, MI (US); Kevin Andrew Gady, Ypsilanti, MI (US); Yu Sun, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 12/828,511

(22) Filed: Jul. 1, 2010

(65) Prior Publication Data

US 2012/0000189 A1    Jan. 5, 2012

(51) Int. Cl.
*F01N 3/00* (2006.01)
(52) U.S. Cl. .......................................... 60/295; 60/286
(58) Field of Classification Search ............ 60/286, 60/295
See application file for complete search history.

(56) References Cited

U.S. PATENT DOCUMENTS

| | | | | |
|---|---|---|---|---|
| 6,993,900 | B2 * | 2/2006 | Upadhyay et al. | 60/286 |
| 7,178,328 | B2 * | 2/2007 | Solbrig | 60/286 |
| 7,559,194 | B2 * | 7/2009 | Westerberg | 60/286 |

FOREIGN PATENT DOCUMENTS

| | | |
|---|---|---|
| DE | 102006021988 A1 | 11/2007 |
| DE | 102008060373 * | 6/2010 |

* cited by examiner

*Primary Examiner* — Thomas Denion
*Assistant Examiner* — Anthony Ayala Delgado (57) ABSTRACT

A method for controlling a selective catalytic reduction injection system having a storage tank, a pump, a delivery line, and an injection nozzle includes monitoring the selective catalytic reduction injection system, determining a selective catalytic reduction injector system effective area ratio, comparing the selective catalytic reduction injector system effective area ratio to a threshold, calculating a compensation factor upon surpassing the threshold, and modifying the commanded injected mass according to the calculated compensation factor.

19 Claims, 8 Drawing Sheets

FIG. 8

US 8,276,373 B2

ADAPTIVE CONTROL OF SCR UREA INJECTION TO COMPENSATE ERRORS

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is an important factor in engine design and engine control. Oxides of nitrogen, NOx, are known by-products of combustion. NOx are created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are desirable.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures and engine air/fuel ratio. Additionally, aftertreatment devices include materials, such as catalyst beds, prone to damage or degradation as a result of use over time and exposure to high temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder and increase engine efficiency, for example, by operating in an unthrottled condition, reducing air intake pumping losses. While temperatures in the combustion chamber can get high enough in pockets of combustion to create significant quantities of NOx, the overall energy output of the combustion chamber, in particular, the heat energy expelled from the engine through the exhaust gas flow, can be greatly reduced relative to other combustion strategies. Such conditions can be challenging to exhaust aftertreatment strategies, since aftertreatment devices frequently require an elevated operating temperature, driven by the exhaust gas flow temperature, to operate adequately to treat NOx emissions.

Aftertreatment devices are known, for instance, utilizing chemical reactions to treat exhaust gas flow. One exemplary device includes a selective catalytic reduction device (SCR). Known uses of an SCR utilize ammonia derived from urea injection to treat NOx. Ammonia stored on a catalyst bed within the SCR reacts with NOx, preferably in a desired proportion of NO and $NO_2$, and produces favorable reactions to treat the NOx. One exemplary embodiment includes a preferred one to one, NO to $NO_2$ proportion, and is known as a fast SCR reaction. It is known to operate a diesel oxidation catalyst (DOC) upstream of the SCR in diesel applications to convert NO into NO2 for preferential treatment in the SCR. Continued improvement in exhaust aftertreatment requires accurate information regarding NOx emissions in the exhaust gas flow in order to achieve effective NOx reduction, such as dosing proper amount of urea based on monitored NOx emissions.

Urea injection used for the aftertreatment of an engine has certain difficulties. Factors such as urea temperature, pump pressure, and injector nozzle obstructions can modify the delivery of urea to the exhaust gas flow thereby preventing the delivery of the appropriate amount of urea. This results in either wasteful use of the stored urea, by providing an excess beyond the required amount, or too little to effectively treat the amount of exhaust produced.

SUMMARY

A method for controlling a selective catalytic reduction injection system having a storage tank, a pump, a delivery line, and an injection nozzle includes monitoring the selective catalytic reduction injection system, determining a selective catalytic reduction injector system effective area ratio, comparing the selective catalytic reduction injector system effective area ratio to a threshold, calculating a compensation factor upon surpassing the threshold, and modifying the commanded injected mass according to the calculated compensation factor.

BRIEF DESCRIPTION OF THE DRAWINGS

One or more embodiments will now be described, by way of example, with reference to the accompanying drawings, in which:

FIG. 6 is a series of graphs which depicts data of actual urea flow and commanded urea flow over time wherein FIG. 6A is urea flow at approximately 25 degrees Celsius (C), FIG. 6B is urea flow at approximately −25 degrees C. without load correction.

FIG. 7 is a series of graphs which depicts data of actual urea flow and commanded urea flow in mg/s over time wherein FIG. 7A is an exemplary graph of an under dosing fault without the disclosed method, FIG. 7B is an exemplary graph of an over dosing fault without the disclosed method.

DETAILED DESCRIPTION

Figure 1:
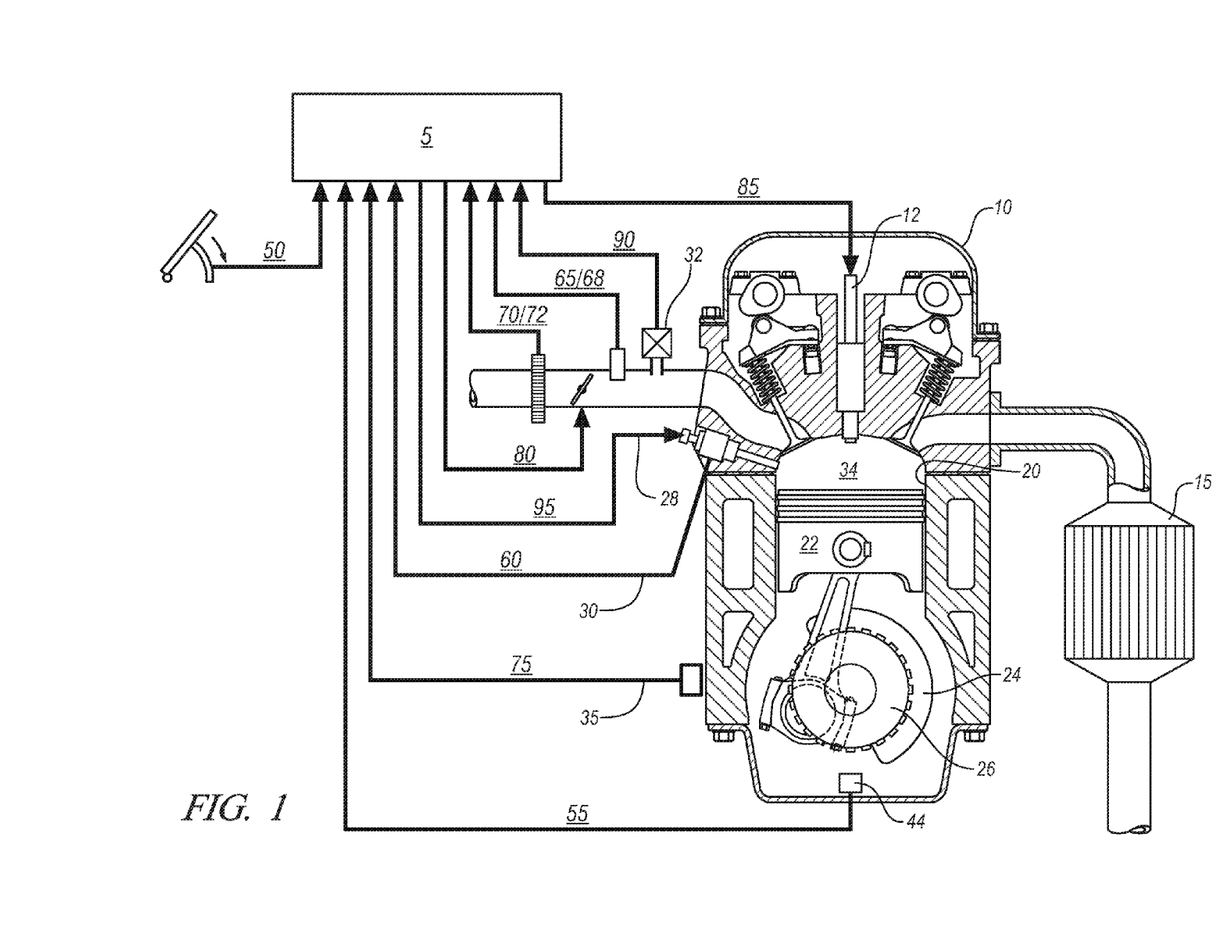
FIG. 1 is a schematic diagram depicting an internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 is a schematic diagram depicting an internal combustion engine 10, control module 5 and exhaust aftertreatment system 15, in accordance with the present disclosure. The exemplary engine 10 is a multi-cylinder, direct-injection internal combustion engine 10 having reciprocating pistons 22 attached to a crankshaft 24 and movable in cylinders 20 which define variable volume combustion chambers 34. Engine 10 may be operated under compression-ignition or spark ignition based upon factors such as engine speed and load. Additionally, engine 10 may be operated using hybrid ignition strategies, such as spark assisted, compression-ignition strategies. This disclosure is intended to include these exemplary embodiments of engine operation, but is not intended to be limited thereto. The crankshaft 24 is operably attached to a vehicle transmission and driveline to deliver tractive torque thereto, in response to an operator torque request (50). The engine 10 preferably employs a four-stroke operation wherein each engine combustion cycle has 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine 10 includes sensing devices to monitor engine operation, and actuators which control engine operation. The sensing devices and actuators are signally or operatively connected to control module 5.

The engine 10 preferably is a direct-injection, four-stroke, internal combustion engine 10 including a variable volume combustion chamber 34 defined by the piston 22 reciprocating within the cylinder between top-dead-center and bottom-dead-center points and a cylinder head including an intake valve and an exhaust valve. The piston 22 reciprocates in repetitive cycles each cycle including intake, compression, expansion and exhaust strokes.

The engine 10 preferably has an air/fuel operating strategy that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine 10, a combustion event occurs during each engine cycle when a fuel charge is injected into the combustion chamber 34 to form, with the intake air, the cylinder charge. The charge is subsequently combusted by action of compression thereof or with the initiation of spark from a spark plug during the compression stroke.

The engine 10 is adapted to operate over a broad range of temperatures, cylinder charge (air, fuel and EGR) and injection events. The methods described herein are particularly suited to operation with direct-injection engines 10 operating lean of stoichiometry to determine parameters which correlate to heat release in each of the combustion chambers 34 during ongoing operation. The methods defined herein are applicable to multiple engine configurations, including spark-ignition engines, compression-ignition engines including those adapted to use homogeneous charge compression-ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection, a late-combustion fuel injection event for aftertreatment management, each which affects cylinder pressure.

Sensing devices are installed on or near the engine 10 to monitor physical characteristics and generate signals which are correlatable to engine and ambient parameters. The sensing devices include a crankshaft rotation sensor, including a crank sensor 44 for monitoring crankshaft speed through sensing edges on the teeth of the multi-tooth target wheel 26. The crank sensor 44 is known, and may include, e.g., a Hall-effect sensor, an inductive sensor, or a magnetoresistive sensor. The crank sensor 44 signal output (55) is input to the control module 5.

There is a combustion pressure sensor 30, having a pressure sensing device adapted to monitor in-cylinder pressure (60). The combustion pressure sensor 30 preferably includes a non-intrusive device having a force transducer with an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug 28 to the sensor 30. The output signal (60) of the sensing element of sensor 30 is proportional to cylinder pressure. The sensing element of sensor 30 has a piezoceramic sensor or other device adaptable as such.

Other sensing devices preferably include a manifold pressure sensor for monitoring manifold pressure (65) and ambient barometric pressure (68), a mass air flow sensor for monitoring intake mass air flow (70) and intake air temperature (72), and a coolant sensor 35 with output (75). The system may include an exhaust gas sensor for monitoring states of one or more exhaust gas parameters, e.g., temperature, air/fuel ratio, and constituents. One having ordinary skill in the art understands that there may be other sensing devices and methods for purposes of control and diagnostics.

The operator input, in the form of the operator torque request (50) is typically obtained through a throttle pedal and a brake pedal, among other devices. The engine 10 is preferably equipped with other sensors for monitoring operation and for purposes of system control. Each of the sensing devices is signally connected to the control module 5 to provide signal information which is transformed by the control module 5 to information representative of the respective monitored parameter. It is understood that this configuration is illustrative, not restrictive, including the various sensing devices being replaceable with functionally equivalent devices and algorithms and still fall within the scope of the disclosure.

The actuators are installed on the engine 10 and controlled by the control module 5 in response to operator inputs, such as operator torque request (50), to achieve various performance goals. Actuators include an electronically-controlled throttle device which controls throttle opening to a commanded input (80), and a plurality of fuel injectors 12 for directly injecting fuel into each of the combustion chambers in response to a commanded input (85), all of which are controlled in response to the operator torque request (50). There is an exhaust gas recirculation valve 32 and cooler, which controls flow of externally recirculated exhaust gas to the engine intake, in response to a control signal (90) from the control module 5. The glow-plug 28 is a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge (mass of fuel) into one of the combustion chambers 34 in response to the command signal (85) from the control module 5. Each of the fuel injectors 12 are supplied pressurized fuel from a fuel distribution system, and have operating characteristics including a minimum pulsewidth and an associated minimum controllable fuel flow rate, and a maximum fuel flowrate.

The engine 10 may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines and homogeneous-charge compression-ignition engines.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position (80), fuel injection mass and timing (85), EGR valve position to control flow of recirculated exhaust gases (90), glow-plug operation (95), and control of intake and/or exhaust valve timing, phasing and lift, on systems so equipped. The control module 5 is adapted to receive input signals from the operator (e.g., a throttle pedal position and a brake pedal position) to determine the operator torque request (50) and from the sensors indicating the engine speed (55) and intake air temperature (72) and coolant temperature and other ambient conditions.

Although FIG. 1 describes an exemplary gasoline engine, it will be appreciated that NOx treatment and aftertreatment systems are utilized in other engine configurations including diesel engines, and the disclosure is not intended to be limited to the specific exemplary engine embodiment described herein.

Figure 2:
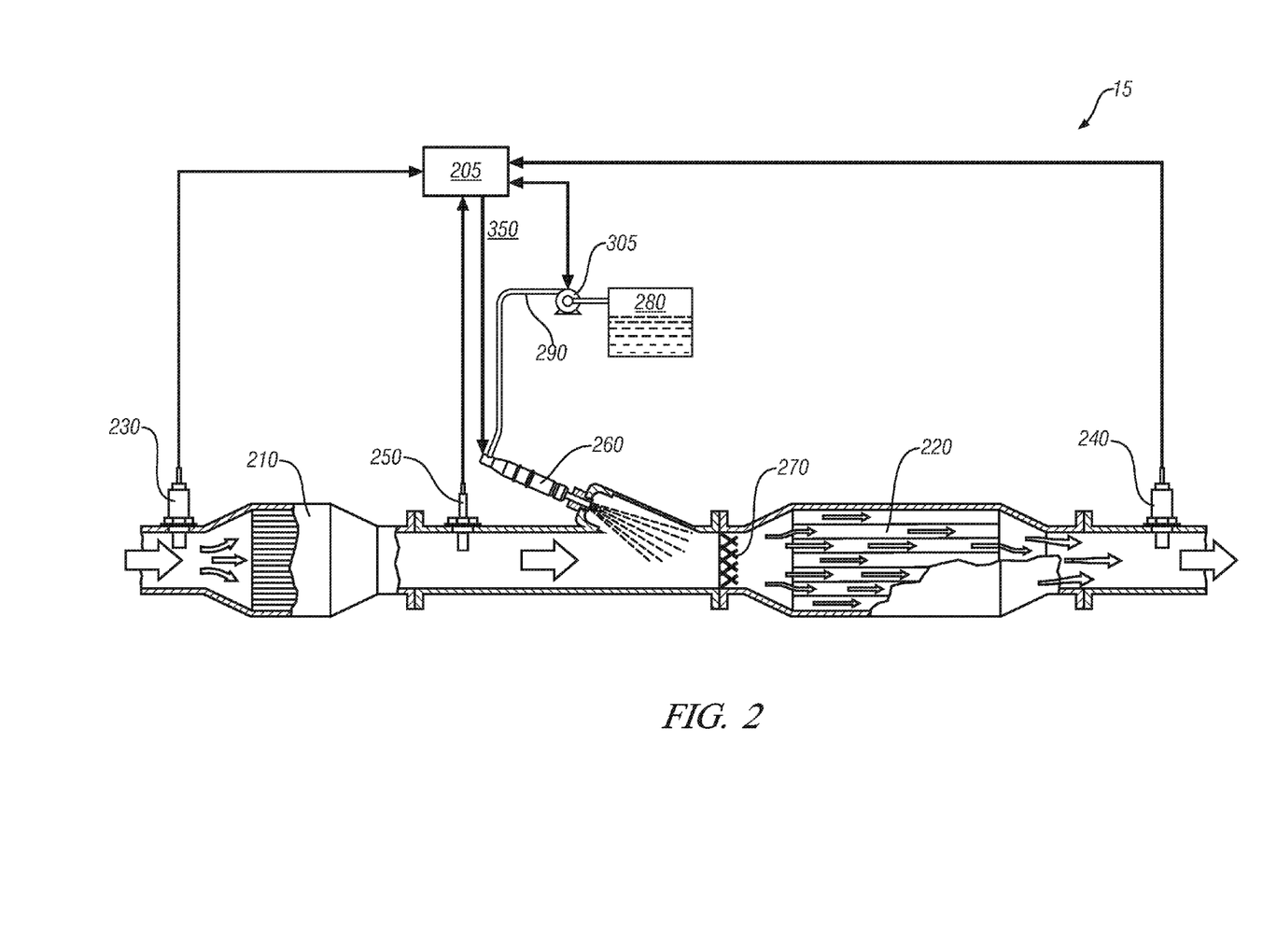
FIG. 2 schematically illustrates an exemplary aftertreatment system including a urea dosing configuration, in accordance with the present disclosure.

FIG. 2 schematically illustrates an exemplary aftertreatment system 15 including a urea dosing configuration. The aftertreatment system 15 includes a control module 205, diesel oxidation catalyst (DOC) 210, selective catalytic reduction (SCR) 220, upstream nitrogen oxide (NOx) sensor 230, downstream NOx sensor 240, temperature sensor 250 and urea dosing module 260. DOC 210 performs a number of catalytic functions necessary for the aftertreatment of an exhaust gas flow. One of the functions of DOC 210 is to convert nitric oxide (NO), a NOx species not easily treated in the SCR 220, into nitrogen dioxide ($NO_2$), a NOx species easily treated in the SCR 220.

The SCR 220 utilizes urea as a reactant to reduce NOx into other molecules. Upstream NOx sensor 230 detects and quantifies NOx in the exhaust gas flow entering aftertreatment system 15. While upstream NOx sensor 230 is illustrated as an exemplary means to quantify NOx entering the aftertreatment system 15, it should be noted that NOx entering the after treatment system 15 can be quantified for use in evaluating conversion efficiency in the SCR 220 by other means, for example, through a NOx sensor 230 located between DOC 210 and SCR 220 or through a virtual NOx sensor modeling engine output and conditions within the exhaust gas flow to estimate the presence of NOx entering the aftertreatment system 15. This disclosure in general discusses a sensor input describing NOx entering the aftertreatment system 15 in accordance with the exemplary embodiment, however it will be appreciated that, depending upon upstream sensor placement, the input could actually describe NOx content entering a portion of the aftertreatment system. SCR 220 utilizes ammonia, for example, as derived from injected urea, to convert NOx to other molecules by methods known in the art.

Temperature sensor 250 is depicted, located in a region to gather exhaust gas flow temperatures within the aftertreatment system 15. The dosing module 260 is depicted in a position upstream of SCR 220 and is connected to a urea storage tank 280 by way of a delivery line 290 to create a urea delivery system, generally shown at 300. The storage tank 280 includes either an internal or external pump 305 for providing urea from the storage tank 280 to the dosing module 260 through the delivery line 290. The control module 205 is signally connected to the pump 305 to control pressure in the delivery line to the dosing module 260. The urea can be directly sprayed by the dosing module 260 into the exhaust gas flow entering the SCR 220 by controlling the size of an orifice opening through a command (350) from the control module 205. However, a preferred method is depicted, utilizing a mixer device 270. The dosing module 260 injects urea upstream of the mixer device 270 then the urea is carried by the exhaust gas flow in a substantially even distribution onto the catalyst surfaces on the interior of SCR 220. Downstream NOx sensor 240 detects and quantifies NOx in the exhaust gas flow exiting the aftertreatment system 15. Control module 205 includes programming required to process inputs related to the aftertreatment system and can include programming to employ methods described herein.

Figure 3:
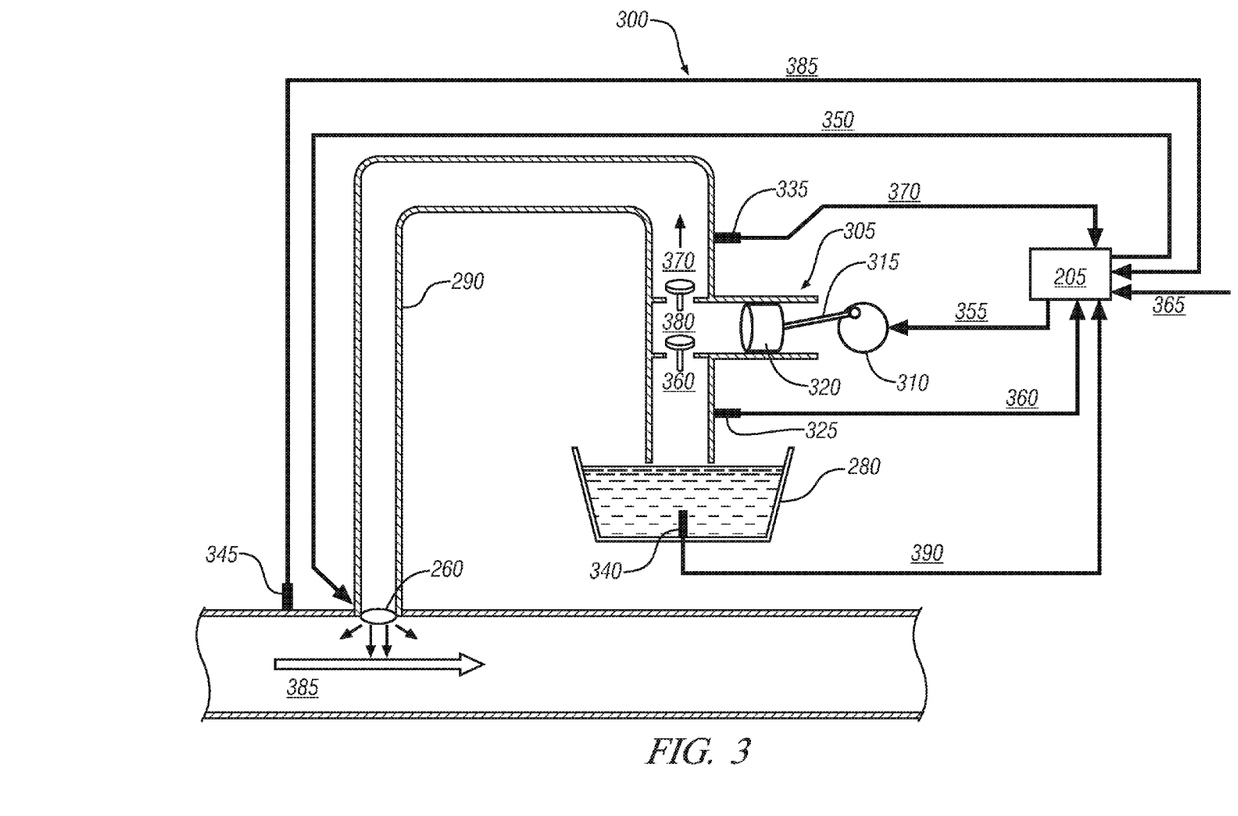
FIG. 3 schematically illustrates an exemplary urea delivery system of the exemplary aftertreatment system including representative mathematical symbols, in accordance with the present disclosure.

FIG. 3 schematically illustrates an exemplary urea delivery system 300 of the exemplary aftertreatment system 15 including representative command signals. The urea delivery system 300 includes storage tank 280, pump 305 and dosing module 260 interconnected by the delivery line 290. The storage tank 280 is positioned in the vehicle as to provide access to the storage tank 280 for refilling. The pump 305 can be located either internally or externally to the storage tank 280. The pump 305 includes a motor 310 or similar rotation providing means for providing rotation to a crankshaft 315. The crankshaft 315 is interconnected to a piston 320 and converts rotational motion of the motor 310 to linear motion at the piston 320 and cycles between an intake and exhaust stroke. The pump 305 also includes an inlet valve 325 and an outlet valve 330 for controlling the flow of urea from the tank 280 to the delivery line 290 and creating pressure therein. The intake stroke occurs as the piston 320 is moved away from the inlet and outlet valves 325, 330 and toward the crankshaft 315. The exhaust stroke occurs as the piston 320 is moved toward the inlet and exhaust valves 325, 330 and away from the crankshaft 315. The description of the pump 305 is illustrative of a preferred embodiment, but is not intended to be limited thereto. For example, the pump 305 may have one of the inlet or outlet valves 325, 330 and not the other to control the pressure in the delivery line 290.

The pump 305 is operatively connected to the control module 205 for controlling the operation of the pump 305. The control module 205 controls pump rotational speed (355) inlet valve 325 and outlet valve 330 open or closed states either through a mechanical connection with the crankshaft 315 or individual commanded activation. The control module 205 receives temperature information (390) either provided by a temperature sensor 340 located in the storage tank 280 or calculated from known atmospheric conditions. Likewise, the control module 205 receives ambient pressure (360) either from an intake pressure sensor located before the inlet valve 325, an ambient pressure sensor remotely located, or calculated from known atmospheric conditions. Desired line pressure (365) is determined in the design of the urea delivery system 300 as a set value. The control module 205 receives pressure feedback (370) information from a pressure sensor 335 downstream of the outlet valve 330 and controls an orifice area (375) of the dosing module 260 by controlling the displacement of a pin located in the orifice by the control command (350). Pump pressure (380) is determined from the pump 305 during control by the control module 205. The control module 205 determines exhaust gas (flow) pressure (385) in the aftertreatment system 15 either through calculation or as direct pressure sensor information 345 located in the after treatment system 15 or elsewhere in the exhaust system.

During operation, the engine 10 is operating and producing exhaust necessary to be treated with the aftertreatment system 15. The control module 205 determines the temperature (390) of the urea in the tank 208 and ambient pressure (360). The control module 205 determines the proper pump 310 rotational speed (355) for the conditions to create a predetermined pressure (370) in the delivery line 290. As the intake stroke of the piston 320 begins, the inlet valve 325 is open and the exhaust valve 330 is closed. The movement of the intake stroke draws the urea from the tank 280 into the pump 305. As the exhaust stroke of the piston 320 begins, the inlet valve 325 is closed thereby preventing the flow of urea back into the tank 280 and the exhaust valve 330 is opened. The exhaust stroke forces the urea into the delivery line 290 and the cycle is repeated. The repeated cycling of the pump 305 causes pressure (370) to build within the delivery line 290.

When the control module 205 determines the pressure (370) in the delivery line 290 has reached the predetermined pressure, the control module 205 stops cycling the pump 305. When the exhaust gas flow is passing the dosing module 260, an injected mass of urea can be directly sprayed by the dosing module 260 into the exhaust gas flow entering the SCR 220 or sprayed to utilize the mixer device 270. The control signal (350) is cyclically sent to the dosing module 260 as a command to control displacement of the pin and therefore the effective orifice area (375) during a cycle, e.g., a cycle may be 0.3 seconds long with half the cycle, 0.15 seconds, dedicated to controlling the orifice area (375) and half the cycle in an off state. Since the delivery line pressure (370) is constant, the control of the dosing module orifice area (375) determines the mass of urea delivered into the exhaust gas flow.

The precise amount of injected mass of urea is important to maintain exhaust gas, and particularly NOx, emissions, at an acceptable level. The control module 205 can calculate if the aftertreatment system 15 is over dosing or under dosing by comparing an amount of desired urea injected to an actual amount of injected urea based on an effective injector orifice area by estimating the relative injector orifice effective area via integration in a dynamic model method. The dynamic model method can determine the amount of commanded urea injected into the exhaust gas flow by the following equations:

$$\dot{U}c = Ao\,(PWMinj)\sqrt{2\frac{Po}{RTo}(Po-Pst)} \qquad [1]$$

where Ao is the commanded orifice size, Po is desired line pressure, and R is the Reynolds number, as is known by one of ordinary skill in the art. The amount of actual urea injected into the exhaust gas flow can be found by the following equation:

$$\dot{U}a = A\,(PWMinj)\sqrt{2\frac{P}{RTo}(P-Pst)} \qquad [2]$$

where A is actual orifice size, PWMinj is injector pulse width, and P is delivery line pressure.

A ratio between the desired and actual urea injection may be established by dividing $\dot{U}a$ by $\dot{U}c$ to yield the following equation:

$$\frac{\dot{U}a}{\dot{U}c} = \frac{A}{Ao}\frac{\sqrt{P(P-Pst)}}{\sqrt{Po(Po-Pst)}} \qquad [3]$$

To calculate the effective orifice area, Equation 3 may integrated, and since A/Ao is designed as a constant it may be removed from integration, resulting in the following equation:

$$\int \dot{U}a\,dt = \frac{A}{Ao}\int \frac{\sqrt{P(P-Pst)}}{\sqrt{Po(Po-Pst)}}\dot{U}c\,dt \qquad [4]$$

and written as a function of pressure, reduces to:

$$\int \dot{U}a\,dt = \frac{A}{Ao}\int f(P,Pst)\dot{U}c\,dt \qquad [5]$$

and written with respect to orifice area as:

$$\frac{A}{Ao} = \frac{\int \dot{U}a\,dt}{\int f(P,Pst)\dot{U}c\,dt} \qquad [6]$$

If the actual amount of urea injected into the exhaust gas flow is equal to the amount of urea commanded, A and Ao are equal resulting in the solution for equation 6 being equal to a preferred embodiment of a desired effective area ratio of one. When more than the commanded urea enters the exhaust gas flow, the result is greater than one. Likewise, when less than the commanded urea enters the exhaust gas flow, the result is less than one. This equation can therefore detect over or under dosing of urea into the exhaust gas flow. It will be appreciated the desired effective area ratio is disclosed according to a preferred injector embodiment. However, the effective area ratio can include other measurable parameters, e.g., commanded and actual dwell, that may determine a ratio of actual urea flow (Ua(t)) to commanded urea flow (Uc(t)).

The control module 205 can calculate the effect of temperature on urea consumption and over dosing or under dosing by monitoring cycling of the motor 310, in the dynamic model method. Urea consumption may be determined by monitoring the motor (PWMmot) signal. If the motor speed is not measured, the motor speed can be determined by a motor equation, which can be written as:

$$\frac{d}{dt}\begin{bmatrix} ia \\ \omega a \end{bmatrix} = \begin{bmatrix} -\frac{Ra}{La} & -\frac{Kv}{La} \\ \frac{kt}{J} & -\frac{B}{J} \end{bmatrix}\begin{bmatrix} ia \\ \omega a \end{bmatrix} + \begin{bmatrix} \frac{1}{La} & 0 \\ 0 & -\frac{1}{J} \end{bmatrix}\begin{bmatrix} Va \\ TL \end{bmatrix} \quad [7]$$

where is motor current, ωa is pump rotational speed, Ra is resistance, La is motor inductance, kt is a coefficient of motor torque, J is motor inertia, Kv is a coefficient of speed generated voltage, B is damping coefficient, Va is voltage proportional to motor PWMmot duty cycle, and TL is torque load which is proportional to pump pressure (380).

When the pump pressure (380) is constant, the following functions are true:

$$\dot{\omega}=f(\omega,PWMmot,P,Tm) \quad [8]$$

where PWMmot is a function of motor control and Tm is the motor winding temperature.

Therefore, equation 6 may be written with respect to temperature effect on load as:

$$\frac{d\dot{U}a}{dt\rho} = f\left(\frac{\dot{U}a}{\rho}, PWMmot, P, Tm\right) \quad [9]$$

Based on the above functions, injection fault is determined if the following equation is true:

$$error = \frac{|\int \dot{U}c - \int \dot{U}a|}{\int \dot{U}c} > 50\% \quad [10]$$

Therefore, equation 9 is able to detect possible injector solenoid valve fault, injector deterioration, blocked urea delivery line, or a frozen delivery line either alone or along with additional detection methods. As will be apparent to one of ordinary skill in the art, the temperature effect may also be determined by a series of look-up tables to determine urea flow characteristics. Additionally, it will be apparent to one of ordinary skill in the art, the percentage in which an error is detected in equation 10 may be adjusted according to system requirements, governmental requirements, or other inputs.

Using equation 9, the dynamic model method can determine the temperature effect on the pump load. The control module 205 can determine the pump pressure (380) on the piston 320 for a given set of conditions by the following equation:

$$Pi = \frac{P + \sqrt{P^2 + 2RTo\left(\frac{\dot{U}a}{A}\right)^2}}{2}\dot{U}a \quad [11]$$

therefore Pi is approximately equal to:

$$P + RTo\left(\frac{\dot{U}a}{A}\right)^2 \quad [12]$$

The dynamic model of equation 9 utilizing the temperature effect, can be written as:

$$\frac{d\dot{U}a}{dt\rho} = f\left(\frac{\dot{U}a}{\rho}, PWMmot, P, \Delta(To, \dot{U}a)\right) \quad [13]$$

The control module 205 can also calculate deterioration in the dosing module 260 or urea delivery system 300 by a filter method utilizing a Kalman filter, as is commonly known to one of ordinary skill in the art. From equation 3, solving for Ua results in the following equation:

$$\dot{U}a = \frac{A}{Ao}\frac{\sqrt{P(P-Pst)}}{\sqrt{Po(Po-Pst)}}\dot{U}c \quad [14]$$

A state space equation for the urea delivery system 300 can be written as:

$$X(k+1)=Xk+Wk \quad [15]$$

$$Yk=Hk\cdot Xk+Vk \quad [16]$$

where Xo is the effective area ratio (A/Ao), Wk is motor noise, Yk is actual urea injection as determined from the motor. Since Yk is the actual urea injection from determined from the motor, we can write equation 17 as:

$$Yk=\dot{U}a(t) \quad [17]$$

with the following relationships:

$$Hk = \frac{\sqrt{P(P-Pst)}}{\sqrt{Po(Po-Pst)}}\dot{U}c(t) \quad [18]$$

$$Wk = N(0, Qk) \quad [19]$$

$$Vk \approx N(0, Rk) \quad [20]$$

Since Ua(t) is estimated from pump motor PWM, the following relation holds true:

$$\frac{d\dot{U}a}{dt\rho} = f\left(\frac{\dot{U}a}{\rho}, PWMmot, P, Tm\right) \quad [21]$$

As will be apparent to one of ordinary skill in the art, a dynamic model method and a filter method have been disclosed in order to calculate actual injected mass versus commanded injected mass. However, it will be appreciated that other methods may be devised to calculate the actual urea flow ($\dot{U}a(t)$) and the commanded urea flow ($\dot{U}c(t)$).

Figure 4:
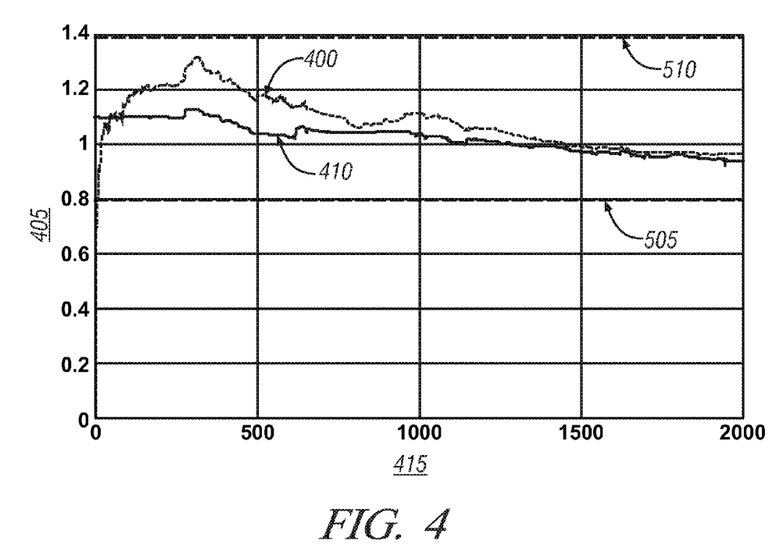
FIG. 4 is graphical data during verification of the dynamic model method and filter method showing effective area ratio of the urea dosing module over time, in accordance with the present disclosure.

FIG. 4 is graphical data during verification of the dynamic model method 400 and filter method 410 showing effective area ratio 405 of the urea dosing module 260 over time 415. The dynamic model method 400 starts on the left of the graph and ramps up to the calculated effective area ratio 405 above one. The dynamic model method 400 continues to overestimate the effective area ratio 405 for a period of time until the effective area ratio 405 settles close to one. The filter method 410 begins estimating the effective area ratio 405 immediately and begins on the left hand side of the graph at a value over one. The filter method 410 has a faster correction factor over the dynamic model method 400 and achieves an estimated effective area ratio 405 close before the dynamic model method 400. A lower correction threshold 505 and an upper correction threshold 510 are set to determine when the filtering, by either or both methods, is to begin. In the exemplary embodiment, the lower correction threshold 505 is set at 0.8 effective area ratio 405 and the upper correction threshold 510 is set at 1.4 effective area ratio 405. If the effective area ratio 405 exceeds either threshold, the control module 205 will begin controlling the dosing module 260 to achieve the effective area ratio 405 of one.

Figure 5:
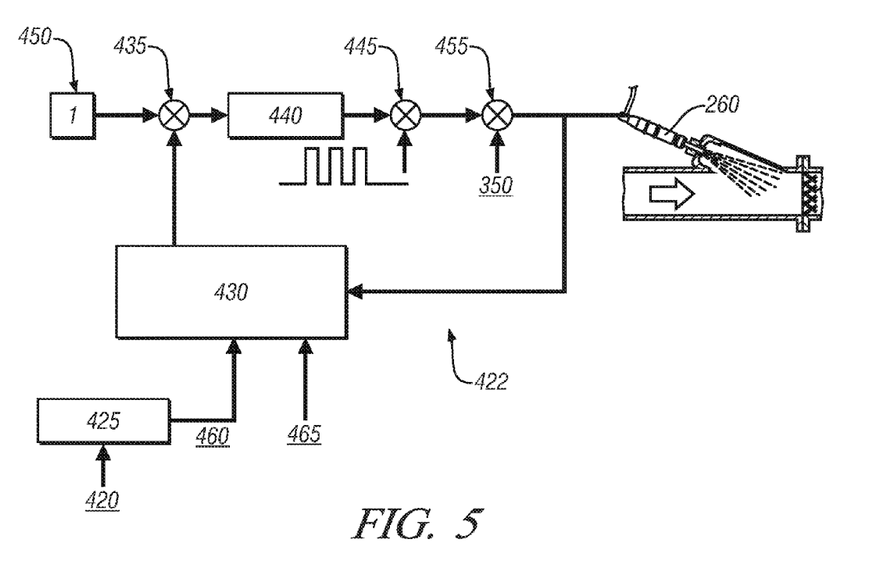
FIG. 5 depicts a diagram for an exemplary control scheme to control the dosing module to provide the commanded amount of urea injected into the exhaust flow of an aftertreatment system, in accordance with the present disclosure.

FIG. 5 depicts a diagram for an exemplary control scheme 422 to control the dosing module 260 to provide the commanded amount of urea injected into the exhaust flow of an aftertreatment system 15. The control scheme 422 includes an actual flow calculation 425, an effective area calculation 430, and a PID controller 440, as is known by one of ordinary skill in the art. Urea delivery system operational parameters 420 are input to the actual flow calculation 425 to determine actual urea flow (460) as described above. The effective area calculation 430 receives input of the actual urea flow (460) and the commanded urea flow (465) and calculates the effective area ratio 405, through the dynamic model method, the filter method, or both.

The effective area ratio 405 calculation 430 result is compared to the desired area ratio 450, in the exemplary embodiment: one, through a ratio comparison 435 to determine if under dosing or over dosing is occurring and if the lower and upper correction thresholds 505, 510 have been transgressed. If the effective area ratio 405 is within bounds of a predetermined lower correction threshold 505 and upper correction threshold 510, the control scheme 422 begins the comparison for the next cycle. If the effective area ratio 405 has transgressed either the lower or upper correction threshold 505, 510, the control scheme 422 inputs the resulting determination into the PID controller 440. The PID controller 440 calculates a compensation factor which is a positive or negative gain to modify the control signal (350) at a signal modification function 445 either increasing or decreasing the effective area of the orifice of the dosing module 260 to migrate the effective area ratio 405 near one.

Once the lower or upper correction thresholds 505, 510 are transgressed, the control scheme 422 continues to function unless the compensation factor no longer adjusts the effective area ratio 405. If the compensation factor is no longer adjusting the effective area ratio 405, the control scheme 422 is reset and begins monitoring for the lower or upper correction threshold 505, 510 to be transgressed, as disclosed above. Further, the control scheme 422 can be reset every ignition cycle, maintain the adjustment correction from a previous ignition cycle, or take other action. In one embodiment, a maximum pressure burst, a series of maximum pressure bursts, a maximum orifice opening, or other action may be taken to clear a potential blockage in the urea delivery system 300.

Figure 6A:
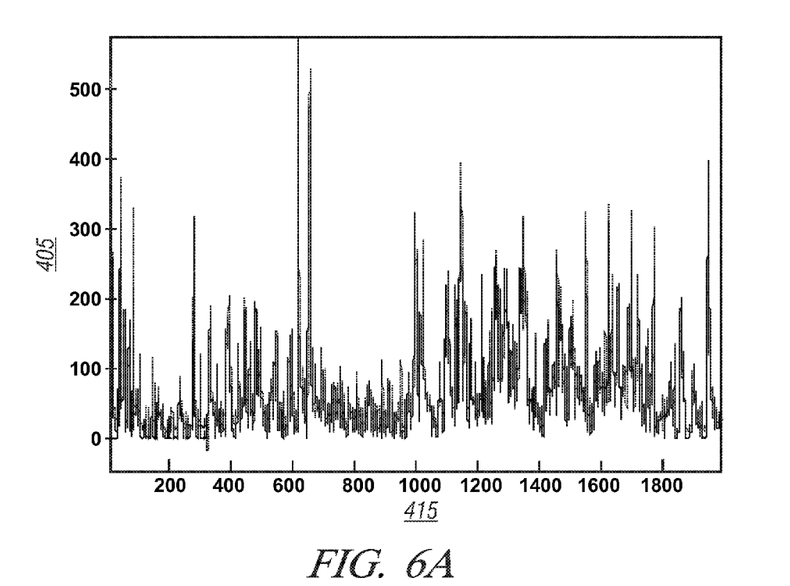
Figure 6B:
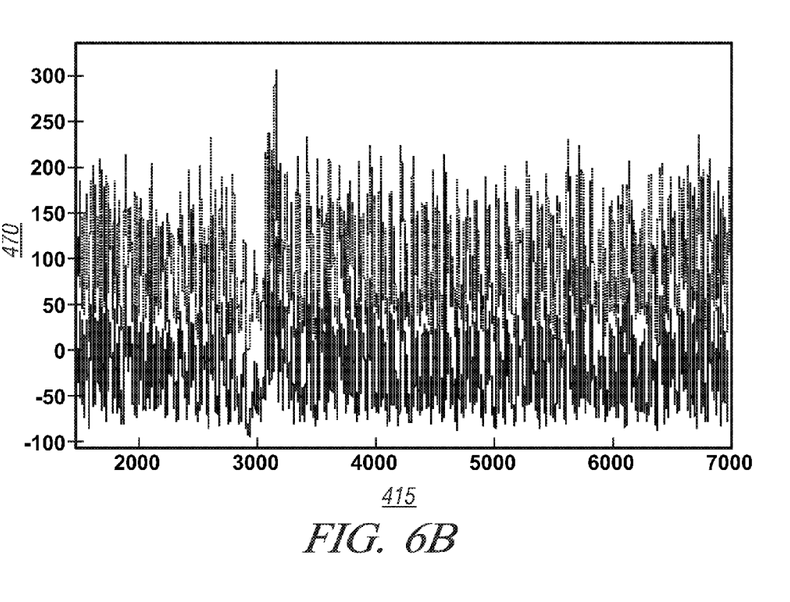
Figure 6C:
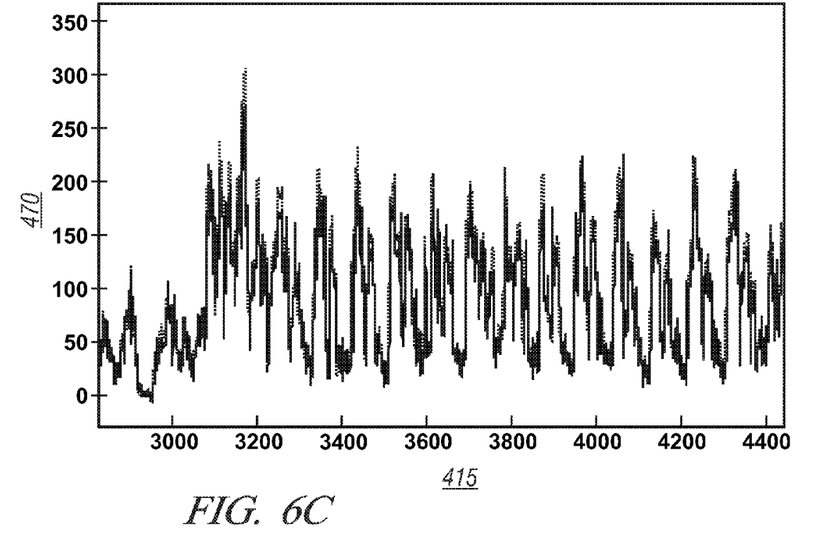
FIG. 6C is urea flow at approximately −25 degrees C. with load correction, in accordance with the present disclosure.

FIG. 6 is a series of graphs which depicts data of actual urea flow and commanded urea flow in g/s 470 over time in seconds 415 wherein FIG. 6A is urea flow at approximately 25 degrees Celsius (C), FIG. 6B is estimated urea flow at approximately 25 degrees C. without the control scheme 422 active, and FIG. 6C is estimated urea flow at approximately −25 degrees C. with the control scheme 422 active. FIG. 6A depicts graphical data of urea flow (g/s) 470 over time (sec) 415 for a urea delivery system 300 at approximately 25 degrees C. One of ordinary skill in the art will recognize 25 degrees C. as standard ambient temperature in which testing is conducted to determine flow characteristics. The graph depicts urea flow characteristics expected at ambient temperatures with actual urea flow (460) approximately equivalent to commanded urea flow (465) and positive flow of urea into the urea delivery system 300 as requested from the control module 205.

However, urea is susceptible to cold temperatures and freezing. FIG. 6B depicts an estimated operational graph of urea flow (g/s) 470 over time (sec) 415 for a urea delivery system 300 without the disclosed control scheme 422 above at approximately −25 degrees C. The actual urea flow (460) diverges from the commanded urea flow (465) resulting in less urea entering the exhaust flow than commanded without the temperature correction factor of equations 12 and 13. The actual urea flow (460) indicates frequent drops below 0 flow rate indicating a lack of urea flow into the urea delivery system 300 as requested by the control module 205. FIG. 6C depicts an operational graph of urea flow (g/s) 470 over time (sec) 415 for a urea delivery system 300 utilizing the control scheme 422 as disclosed above to correct for the temperature of approximately −25 degrees C. The actual urea flow (460) once again closely matches the commanded urea flow (465) with the traces being approximately equivalent.

Figure 7A:
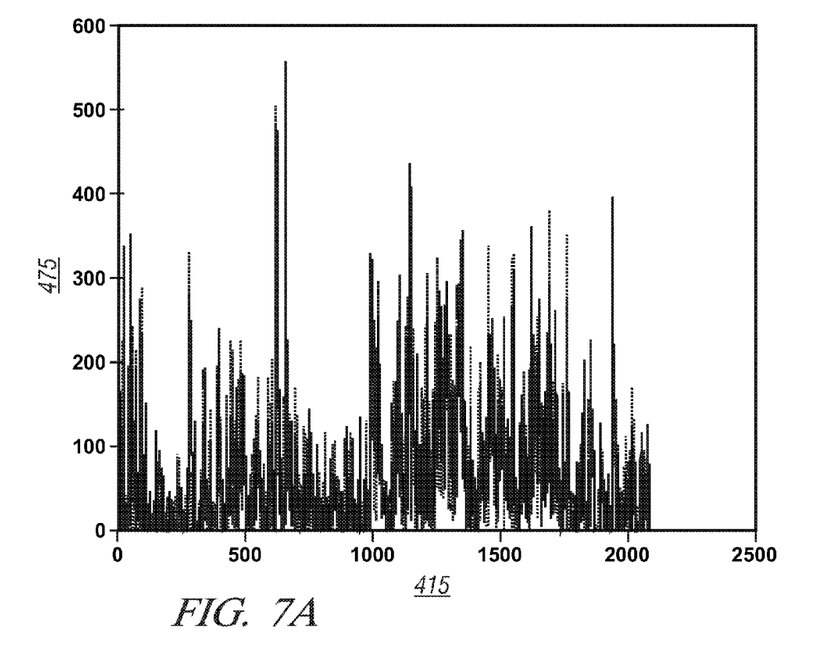
Figure 7B:
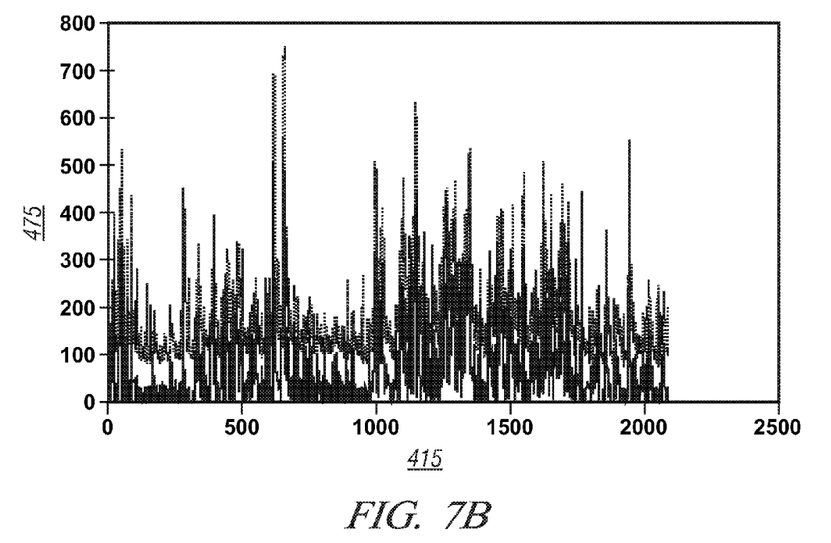
Figure 7C:
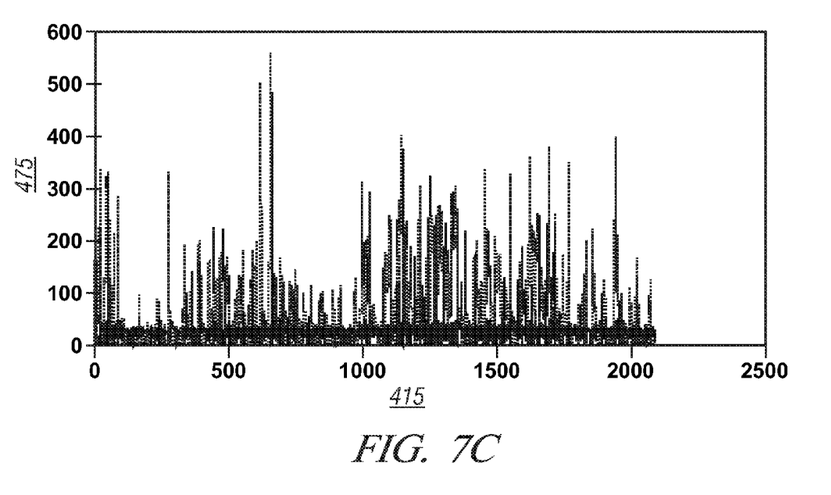
FIG. 7C is an exemplary graph of urea flow using the disclosed method to correct for under dosing and overdosing faults, in accordance with the present disclosure.

FIG. 7 is a series of graphs which depicts data of actual urea flow and commanded urea flow in (mg/s) 475 over time (sec) 415 for a urea delivery system 300 wherein FIG. 7A is an exemplary graph of an operational urea delivery system 300, FIG. 7B is an exemplary graph of an over dosing fault without the disclosed method, and FIG. 7C is an exemplary graph of an under dosing fault without the disclosed method. FIG. 7A depicts an embodiment of the disclosed method wherein the urea delivery system 300 is operational to treat exhaust gas flow. The control scheme 422 computes the actual urea flow calculation 425 determining actual urea flow (460) and compares it to the commanded urea flow (465) in the effective area calculation 430 creating the effective area ratio 405 to be compared to the desired effective area ratio 405. When the effective area ratio 405 has transgressed the lower or upper correction thresholds 505, 510, the effective area ratio 405 is input to the PID controller 440 for calculating a positive or negative gain to correct for over or under dosing of the urea delivery system 300. The gain modifies the control signal (350) sent to the dosing module 260 so that actual urea flow (460) is approximately equivalent to commanded urea flow (465). When the effective area ratio 405 is within the lower or upper correction thresholds 505, 510, the PID controller 440 does not calculate the gain and the control signal (350) is sent to the dosing module 260 unmodified.

FIG. 7B depicts an embodiment of an over dosing fault, e.g., line pressure (370) too high and an increase in orifice size of the dosing module 260, wherein the commanded urea flow (465) includes high variation of the amount of commanded urea flow (465). The commanded urea flow (465) has a series of peaks that begin at zero mg/s. The actual urea flow (460) approximately follows the same commanded urea flow (465), however it is shifted upwards providing more urea flow than commanded at every point of the graph.

FIG. 7C depicts an embodiment of an under dosing fault, e.g., a blockage in the urea delivery system 300 and motor control issues (PWMmot), wherein the commanded urea flow (465), includes high variation of the amount of commanded urea flow (465). The commanded urea flow (465) includes peaks of over 500 mg/s, however the actual urea flow (460) is steady and does not match any of the commanded peaks.

Figure 8:
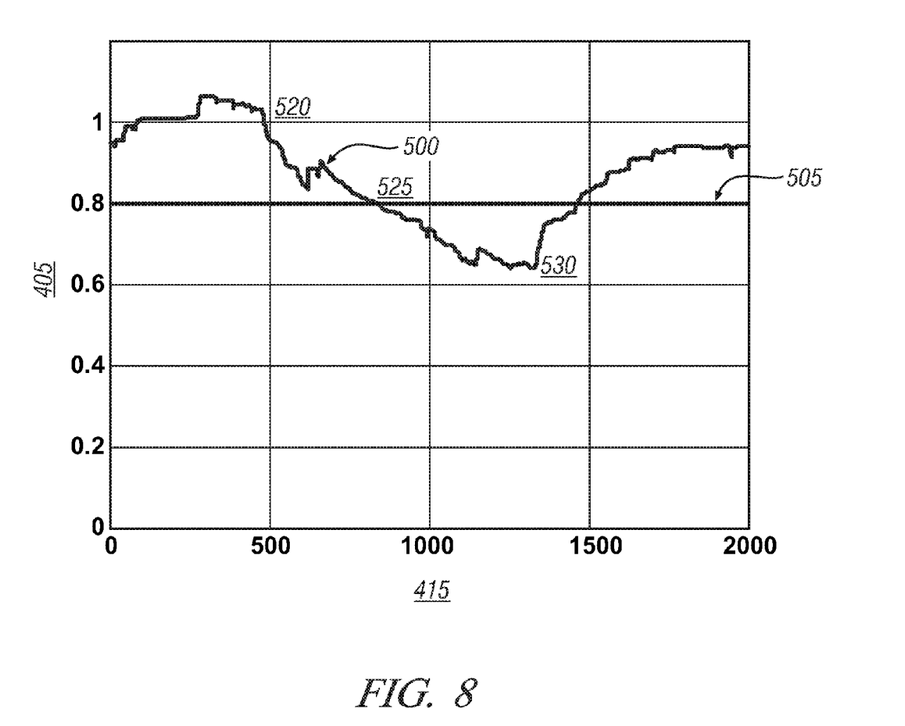
FIG. 8 is a graphical representation of experimental data illustrating the control scheme reacting to a simulated urea dosing module deterioration indicating effective area ratio over time, in accordance with the present disclosure.

FIG. 8 is a graphical representation of experimental data illustrating the control scheme 422 reacting to a simulated urea dosing module 260 deterioration indicating effective area ratio 405 over time. The effective area ratio trace of the dosing module 260 is shown at 500. The effective area ratio trace 500 begins on the left of the graph close to a ratio of one, representing the actual urea flow (460) being approximately equal to the commanded urea flow (465). A blockage of the dosing module 260 is simulated at approximately point 520 as represented by a reduction in the effective area ratio trace 500. At point 525, the effective area ratio trace 500 transgresses the lower threshold 505 signaling the control scheme 422 to begin modifying the dosing module command (350), as discussed above. The control scheme 422 gains control at approximately point 530 as the effective area ratio calculation 430 begins to increase and surpass the lower threshold 505 and begins controlling the effective area ratio trace 500 close to the desired effective area ratio 450.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a selective catalytic reduction injection system having a storage tank, a pump, a delivery line, and an injection nozzle, comprising:
monitoring the selective catalytic reduction injection system;
determining a selective catalytic reduction injector system effective area ratio;
comparing the selective catalytic reduction injector system effective area ratio to a threshold;
calculating a compensation factor upon surpassing the threshold; and
modifying the commanded injected mass according to the calculated compensation factor.

2. The method of claim 1, wherein determining the selective catalytic reduction injection system effective area ratio comprises monitoring an actual injected mass and a commanded injected mass.

3. The method of claim 2, wherein the actual injected mass is calculated from monitored parameters in a dynamic model method.

4. The method of claim 3, wherein calculation of the actual injected mass comprises integrating monitored parameters to determine actual flow characteristics.

5. The method of claim 2, wherein the actual injected mass is calculated from monitored parameters in a filter method.

6. The method of claim 5, wherein the filter method comprises a state-space equation to determine actual flow characteristics.

7. The method of claim 2 wherein the actual injected mass is calculated from monitored parameters in a dynamic model method and in a filter method.

8. The method of claim 1, wherein the threshold comprises one of an upper threshold and a lower threshold.

9. The method of claim 1, wherein calculating the compensation factor upon surpassing the threshold comprises determination of a temperature effect.

10. The method of claim 9, wherein determination of the temperature effect is based upon pump pressure.

11. The method of claim 9, wherein determination of the temperature effect is based upon look-up tables.

12. Method for controlling fluid injection from a selective catalytic reduction injection system to achieve a requested fluid flow into an exhaust flow from an internal combustion engine during engine operation, the method comprising:
monitoring operational parameters of the selective catalytic reduction injection system including a commanded injected mass and an exhaust flow pressure;
determining an actual injected mass;
calculating an effective area ratio;
comparing the effective area ratio to a desired effective area ratio; and
modifying an injector control signal to adjust the effective area ratio to match the desired effective area ratio.

13. The method of claim 12, wherein the actual injected mass is determined by an integration method.

14. The method of claim 12, wherein the actual injected mass is determined by a filter method.

15. The method of claim 12, wherein the actual injected mass is determined by an integration and a filter method.

16. The method of claim 12, wherein monitoring operational parameters of the selective catalytic reduction injection system further includes monitoring a temperature of the fluid.

17. The method of claim 16, wherein the temperature of the fluid is used to determine actual injected mass.

18. The method of claim 12, wherein calculating the effective area ratio determines an amount of over dosing or under dosing.

19. The method of claim 12, wherein modifying the injector control signal to adjust the effective area ratio to match the desired effective area ratio includes calculating a gain to modify the injector control signal.

* * * * *